United States Patent Office 3,124,376
Patented Mar. 10, 1964

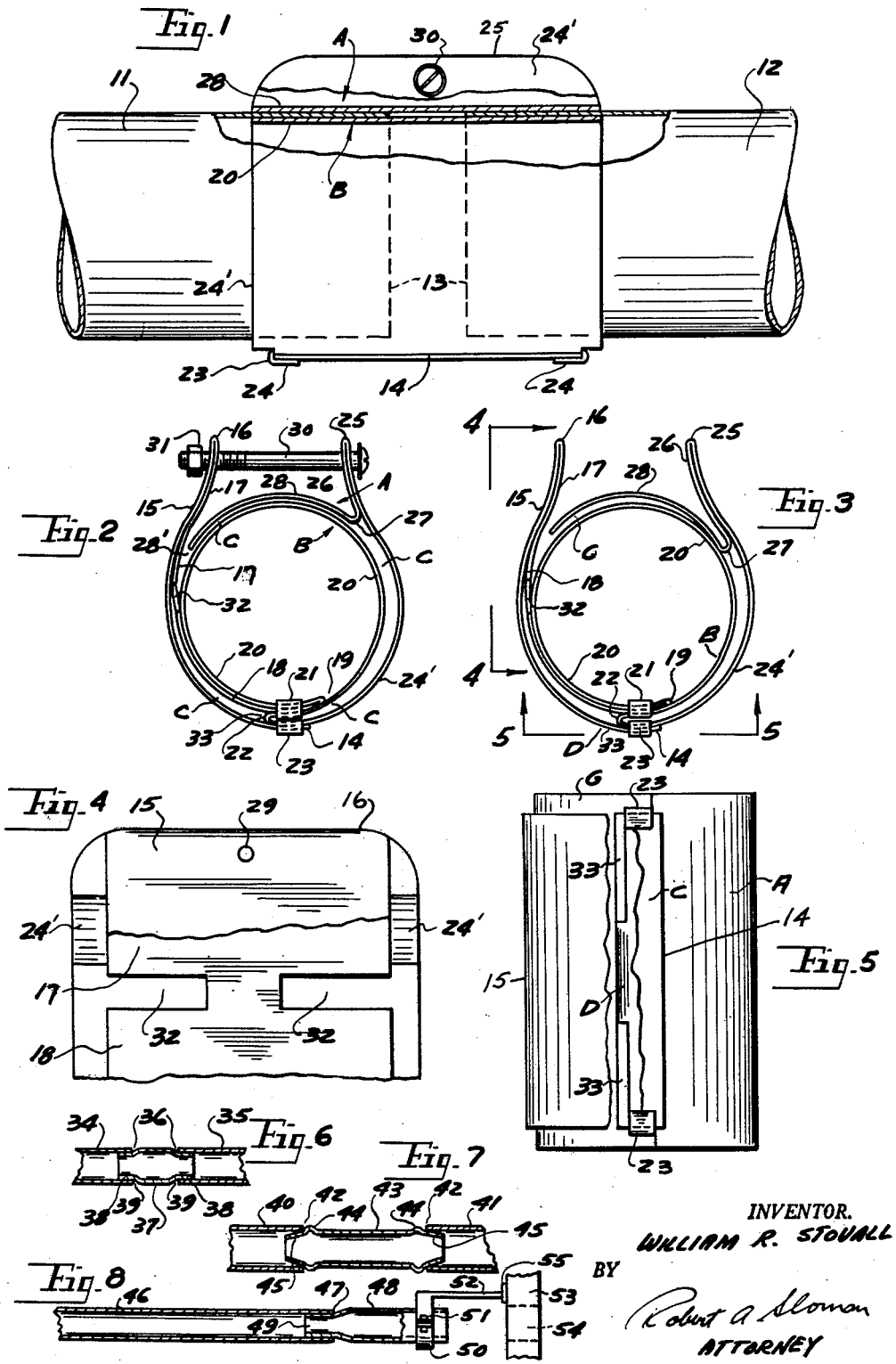

1

3,124,376
EXHAUST PIPE REPAIR AND REPLACEMENT ADAPTER
William R. Stovall, Milford, Mich.
(3507 S. Epperly, Del City, Okla.)
Filed Mar. 4, 1960, Ser. No. 12,836
3 Claims. (Cl. 285—398)

This invention relates to a vehicle exhaust pipe repair adapter and more particularly to a unit strip formed into a pair of concentric sleeves adapted to cooperatively receive and join together spaced free end portions of a vehicle exhaust pipe.

Heretofore when an exhaust pipe or tail pipe of a vehicle becomes rusted away and has a hole therein, it is normally necessary to replace the same. Unfortunately there has been no convenient repair adapter which could be used, which would effectively replace the rusted away portion of the exhaust or tail pipe. Various makeshift devices have been provided in the nature of a sleeve, which would fit around or clamp around the exhaust pipe for the purpose of a temporary protection. The disadvantage of these, however, is that they are of a very temporary character, engage only around the exterior of the broken exhaust pipe, and within a short period only slip off or fall out of place.

It is the object of the present invention to provide an exhaust pipe repair adapter which is formed from a single strip of metal, which is suitably reverse folded and formed so as to define a pair of connected concentric sleeves, which are adapted to span and interconnect the spaced free ends of the damaged exhaust pipe in such a manner that the respective free ends are snugly projected within and between the concentric sleeves of the adapter and secured therein.

It is a further object of the present invention to provide an adapter of the type mentioned wherein outer portions, i.e., cross over portions of the strip between the inner and outer sleeves have formed therein opposed pairs of spaced longitudinal slots which extend inwardly from their respective ends for the purpose of receiving the cutaway spaced apart portions of the damaged exhaust pipe. These slots are essential where a continuous strip of material is employed to form a concentric sleeve, which is actually a one-piece element.

It is a further object to provide a repair adapter for exhaust pipes and tail pipes of vehicles wherein there is provided an inner sleeve and an outer sleeve together with clamping means for securing adjustably together free end extensions of the said outer sleeve for effectively securing the adapter to portions of the exhaust pipe or tail pipe.

It is a further object to define in the said adapter an outer sleeve, a portion of which is formed from the free end of the strip employed and which laterally overlies and interlocks with a corresponding reverse turn portion of the strip and is interconnected therewith. At the same time the first mentioned reversed turn portion also forms a portion of the inner sleeve for cooperative overlying engagement with respect to additional reverse turned portion of the stip for interlocking adjusting relation with respect thereto.

It is a further object to provide a repair adapter for a vehicle exhaust pipe or a tail pipe in the nature of a cylindrical member, whose respective end portions are of reduced diameter defining intermediate shoulders, with the said free ends respectively projected into free end portions of the exhaust pipe to be patched and with the said shoulders cooperatively and retainingly engaging said free ends of the exhaust pipe to provide a self-locating and self-locking adapter.

2

It is a further object of the present invention to provide a tail pipe extension adapter wherein a portion of the adapter is of reduced diameter defining a shoulder projectible within the free end of the tail pipe with the shoulder operatively engaging the end of the tail pipe and with the opposite end of the adapter mounted by a suitable bracket to a portion of the vehicle rear bumper.

These and other objects will be seen from the following specification and claims in conjunction with the appended drawing in which:

FIG. 1 is a side elevational view of a portion of a vehicle tail pipe which has been rusted away and whose ends have been cut away and are respectively projected into opposite ends of the present repair adapter, being partially broken away and sectioned, for illustration.

FIG. 2 is a left hand view of the present repair adapter as assembled but omitting the exhaust pipe portions.

FIG. 3 is a view similar to FIG. 2 but illustrating the strip as formed into the two concentric sleeves before final assembly.

FIG. 4 is a fragmentary section taken on line 4—4 of FIG. 3, partially broken away for illustration.

FIG. 5 is a section taken on line 5—5 of FIG. 3, partially broken away for illustration.

FIG. 6 is a side elevational view of a slightly different form of exhaust pipe repair adapter.

FIG. 7 is a similar view of still another form of exhaust pipe repair adapter.

FIG. 8 is a fragmentary side elevational view of an adapter extension for a vehicle tail pipe.

It will be understood that the above drawing illustrates merely a preferred embodiment of the invention and that other embodiments are contemplated within the scope of the claims hereafter set forth.

Referring to the drawing, the present repair adapter is shown in FIG. 1 as assembled with respect to portions of a vehicle tail pipe 11—12, a rusted portion of which has been cutaway defining the free ends 13 which cooperatively project within the inner and outer sleeves A and B of the present adapter now to be described.

The repair adapter consists of a unitary strip of spring steel or stainless steel or the equivalent material which is suitably formed or reverse folded so as to define the aforesaid pair of inner and outer sleeves A and B, which are adapted to receive the cutaway free end portions 13 of the tail pipe 11—12.

As shown in FIGS. 2 and 3, the strip includes the free end 14 which is curved upwardly as shown at 15 terminating at 16 in the reverse curved portion 17 which bears against the inner surface of the member 15 and is curved downwardly and inwardly to define as at 18 an outer wall portion of the inner sleeve B. This outer wall portion adjacent the bottom of FIG. 2, is reverse curved at 19 terminating in the inner wall portion 20, which is substantially circular in shape forming the interior surface of the inner sleeve B.

The inner sleeve portion 20 extends throughout substantially 360 degrees, is reverse curved at 22 to define the outer wall 24', which is curved upwardly forming a portion of the outer sleeve A.

The outer wall portion 24' at its upper end is reverse curved at 25 terminating in the inner wall extension 26 which defines the one securing tab for the adapter. The member 26 bears against the inner surface of the upper portion of the outer wall element 24' and is reverse curved at 27 to thus define the remainder of the outer wall portion 28 of the outer sleeve A, ending at 28'. Thus the free ends of the strip of metal are shown at 14 and 28', and as formed in the manner shown in FIGS. 2 and 3 provides the pair of concentric sleeves A and B, which are secured to each other to form the present adapter.

The upstanding free end portion 15—16—17 of the said strip defines the second tab projecting upwardly of the assembly in opposed spaced relation to the first mentioned tab 24—25—26. These two tabs are oppositely apertured as at 29, FIG. 4 to cooperatively receive the securing bolt or screw 30 and the nut or fastener 31 for drawing the said tabs together and for effectively securing inner and outer sleeves B and A with respect to the cut free end portions 13 of the exhaust pipe or tail pipe elements 11—12.

It is noted that the inner sleeve B is defined by opposing pair of reverse curved elements forming a part of the strip. These are arranged in oppositely extending positions and in overlapping engaging relation and are adjustably connected with respect to each other by the securing tabs 21.

The said tabs 21 project radially inward from end portions of the inner sleeve 20 adjacent its reverse curved portion 22 and extend inwardly longitudinally toward each other as to adjustably and slidably receive the reverse curved free end portions 18—19—20 forming the other half of the inner sleeve B.

There is an additional pair of tabs, which project radially outward and are reverse curved inwardly as at 23 forming end extensions of the reverse curved portions 24' adjacent the reverse turn point 22. These tabs 23 are adapted to supportably and slidably receive the free end portion 14 of the strip 15 to thus define the outer wall of the outer sleeve A.

Thus there is an adjustability factor between the portions which define the outer sleeve for determining the effective diameter thereof so as to cooperatively receive therebetween at the space indicated at C the respective free ends 13 of the exhaust pipe or tail pipe elements 11 and 12.

Now that the inner and outer sleeves A and B are formed, inasmuch as this is a continuous strip, it is necessary that at each end of the respective sleeves there be formed a pair of parallel slots 32 and 33 which extend longitudinally towards each other as shown in FIGS. 4 and 5 to thus provide an entrance for free ends 13 of exhaust pipe elements 11 and 12. Without the said slots 32 and 33, it would be impossible to insert the free ends 13 of said exhaust pipe elements. After assembly, the tabs are drawn together by adjusting the fastener 30—31 to effectively secure the repair adapter as shown in FIG. 1.

Referring to FIG. 6, there is shown a simplified form of repair adapter for a broken exhaust pipe 34—35 wherein the rusted portion has been cut away defining the free ends 36. A cylindrical adapter 37 of stainless steel or the like is provided with a pair of reduced end portions 38 with the intermediate shoulders 39. The said reduced ends project into the free end portion of the respective exhaust pipe elements 34—35. The corresponding ends 36 of said exhaust pipe elements operatively engage the respective shoulders 39 on the adapter to thus provide for self securing and self locating of the adapter once it has been assembled with respect to the exhaust pipe elements 34—35, which are relatively immovable with respect to each other.

Another slightly different form of repair adapter for a pair of exhaust pipe elements 41—40 is shown in FIG. 7. Here the exhaust pipe elements have been cut away, removing the rusted away portion to thus define the free ends 42. The adapter of stainless steel or the like is of cylindrical form as at 43 and includes the tapered ends 45 of reduced diameter which are adapted to cooperatively project within the cutaway ends 42 of the exhaust pipe elements 41—40.

A pair of upset annular shoulders 44 are formed upon portions of the sleeve 43 inwardly of its tapered ends 45 to thus provide stop means cooperatively engageable with the free end portions 42 of the exhaust or tail pipe members 40—41. Here also, there is provided a repair adapter which is self securing and self locating with respect to the relatively immovable tail pipe elements 40—41.

The present invention also contemplates, as shown in FIG. 8 an extension adapter for a vehicle tail pipe wherein for example, the tail pipe does not extend all the way to the end of the vehicle chassis or to the vehicle bumper fragmentarily shown at 53 and apertured at 54 in a conventional manner normally adapted to receive the free end portion of the tail pipe 46.

The present adapter is in the nature of a sleeve of stainless steel 48 whose reduced free end 49 projects within the open end 47 of the tail pipe. The reduced end 49 of the sleeve 48 thus defines between the reduced end and sleeve the shoulder portion which operatively engages the free end 47 of the tail pipe to limit the introduction of the reduced portion 49 thereinto. The opposite end of the adapter 48 is spaced inwardly of the apertured bumper 53 in substantial axial registry with the opening 54 through said bumper. A suitable bracket 50 is secured around the outer end of the adapter sleeve 48 and fixedly secured thereto at 51. The said bracket includes the rearwardly extending arm 52, which extends to and is suitably secured to a portion of the bumper as at 55, completing the assembly.

Having described my invention, reference should now be had to the following claims.

I claim:

1. A vehicle exhaust pipe repair adapter consisting of a unit strip of metal having a series of reverse folds and formed defining a pair of concentric sleeves adapted to span and interconnect the spaced ends of a damaged exhaust pipe or tail pipe, cross-over portions in said strip extending between and interconnecting said sleeves and having opposed pairs of spaced longitudinal slots extending inwardly from their respective ends, adapted to receive end portions of said exhaust pipe or tail pipe ends, said sleeves respectively engaging and overlying the inner and outer surfaces of said exhaust or tail pipe ends, a pair of said reverse folds being formed in the outer sleeve defining a pair of upright oppositely apertured free ends, and a fastener interconnecting and drawing up and maintaining said ends in fixed relation for immovably securing said sleeves relative to said exhaust or tail pipe ends.

2. In the exhaust pipe repair adapter of claim 1, one of said cross-over portions including another of said reverse folds extending throughout the length of said sleeves, tabs extending radially from the ends of said latter reverse fold and longitudinally inward in opposed relation, cooperatively receiving a laterally overlapped one free end of said strip.

3. In the exhaust pipe repair adapter of claim 1, one of said cross-over portions including another of said reverse folds extending throughout the length of said sleeves, tabs extending radially from the ends of said latter reverse fold and longitudinally inward in opposed relation, cooperatively receiving a laterally overlapped one free end of said strip, the inner sleeve including a pair of oppositely arranged laterally overlapped reverse folds, and tabs extending radially from the ends of one of said latter reverse folds and longitudinally inward in opposed relation cooperatively receiving the other of said latter reverse folds.

References Cited in the file of this patent

UNITED STATES PATENTS

| | | |
|---|---|---|
| 1,146,813 | Peterman | July 20, 1915 |

FOREIGN PATENTS

| | | |
|---|---|---|
| 529,185 | Great Britain | Nov. 15, 1940 |